United States Patent
Klosky

(10) Patent No.: US 8,399,764 B2
(45) Date of Patent: Mar. 19, 2013

(54) WATER RESISTANT CASE FOR A MOBILE ELECTRONIC DEVICE

(76) Inventor: Justin Klosky, Los Angeles, CA (US)

( * ) Notice: Subject to any disclaimer, the term of this patent is extended or adjusted under 35 U.S.C. 154(b) by 168 days.

(21) Appl. No.: 13/075,663

(22) Filed: Mar. 30, 2011

(65) Prior Publication Data

US 2011/0242744 A1  Oct. 6, 2011

Related U.S. Application Data

(60) Provisional application No. 61/319,509, filed on Mar. 31, 2010.

(51) Int. Cl.
*H02G 3/08* (2006.01)

(52) U.S. Cl. ..... 174/50; 174/520; 174/350; 361/679.01; 248/906

(58) Field of Classification Search ................ 174/17 R, 174/50, 350, 520, 559; 361/814, 818, 679.01; 439/535; 248/906; 220/4.02
See application file for complete search history.

(56) References Cited

U.S. PATENT DOCUMENTS

| | | | |
|---|---|---|---|
| 5,797,683 A | 8/1998 | Gunzi et al. | |
| 6,760,570 B1 | 7/2004 | Higdon | |
| 6,785,566 B1 | 8/2004 | Irizarry | |
| 7,050,712 B2 | 5/2006 | Shimamura | |
| 7,755,975 B2 | 7/2010 | Pettersen et al. | |
| 7,757,384 B2 | 7/2010 | MacAuley et al. | |
| 7,916,500 B2 * | 3/2011 | Shi et al. | 361/816 |
| 7,937,126 B2 * | 5/2011 | Oh | 455/575.4 |
| 8,101,859 B2 * | 1/2012 | Zadesky | 174/50 |
| 8,236,405 B2 * | 8/2012 | Ren | 428/137 |
| 2004/0014506 A1 | 1/2004 | Kemppinen | |
| 2007/0019804 A1 | 1/2007 | Kramer | |
| 2007/0121973 A1 | 5/2007 | Tsang | |
| 2007/0215663 A1 | 9/2007 | Chongson et al. | |

OTHER PUBLICATIONS

Advertisement for Overboard(R) Pro-Sport Waterproof MP3 Case, from <<http://www.thewaterproofstore.com/whtmp3case.html>>.
Advertisement for Capture(TM) Waterproof Case for iPod Nano (5th Gen), from <<http://www.h2oaudio.com/store/waterproof-case/capture-waterproof-case-for-ipod-nano-5th-gen.html>>.
Advertisement for Sanwa Waterproof bag for iPhone or iPod, from <<http://directsanwa.co.jp/ItemPage/200-PDA016>>.
Description of iPhone 3G Water Resistant or Waterproof Cases, from <<http://bindapple.com/iphone-3g-water-resistant-or-waterproof-case/>>.
Advertisement for Dry Pak(R) Floating Waterproof Cell Phone Case, from <<http://www.overtons.com/modperl/product/details.cgi?i=70411&pdesc=Dry_Pak_Floating_Waterproof_Cell_Phone_Case&str=Dry+Pak+&merchID=4005>>.
Advertisement for Cell Phone Waterproof Case Cover Bag Floating 2pack, from <<http://cgi.ebay.com/Cell-Phone-Waterproof-Case-Cover-Bag-Floating-2pack-/260796914906?pt=LH_DefaultDomain_0&hash=item3cb8b51cda>>.

* cited by examiner

*Primary Examiner* — Dhirubhai R Patel
(74) *Attorney, Agent, or Firm* — Stewart & Irwin, P.C.; Dennis S. Schell

(57) ABSTRACT

A water resistant case is provided for a mobile electronic device. The case includes a buoyancy feature, and is sized and configured so that the case is buoyant in water when containing the mobile electronic device. A closure portion of the case is movable between an extended position for receiving the mobile electronic device, to a folded position when the case contains the mobile electronic device. In the folded position the closure portion is provided adjacent to the rest of the case. The configuration of the case is such that the case can be relatively form fitting to the mobile electronic device.

20 Claims, 4 Drawing Sheets

WATER RESISTANT CASE FOR A MOBILE ELECTRONIC DEVICE

This application claims priority to U.S. Provisional Patent Application No. 61/319,509, filed Mar. 31, 2010.

BACKGROUND

1. Field of the Invention

The present invention relates to a case for a mobile electronic device. More specifically, the present invention relates to a case that is relatively form fitting to a mobile electronic device, wherein the case is water resistant, and wherein the case when holding the mobile electronic device is buoyant in water.

2. Related Art

Mobile electronic devices, such as cellular telephones and music players, are becoming more and more popular. Because mobile electronic devices provide the ability to communicate with others, provide access to information, or provide video and audio entertainment, people are taking mobile electronic devices to almost any place they go. Unfortunately, the outer casings of mobile electronic devices are often not water resistant or otherwise sealed to prevent damage to the sensitive electronics that make up the devices. Hence, accidents such as submersion of a mobile electronic device in water at a pool or at a beach are common place, and these accidents may end up rendering a device unusable. Moreover, the outer surfaces of mobile electronic devices are often made from materials that can be easily scratched.

Cases are often provided for mobile electronic devices in order to reduce the possibility of damaging the device from inadvertent contact with liquids, inadvertent drops, corrosion in high humidity environments, etc. Some of these cases are made to be water resistant, and some are further made to be buoyant in water. Such cases, however, are cumbersome and bulky. Thus, while there have been efforts to design aesthetically pleasing mobile electronic devices, the devices are often obscured in unattractive cases in order to ensure against accidental damage. Moreover, such bulky cases often cannot be held in convenient places such as shirt or pants pockets.

SUMMARY OF THE INVENTION

The present invention provides a case for a mobile electronic device that can be relatively form fitting to the mobile electronic device, water resistant, and buoyant when holding the mobile electronic device.

In one embodiment, a water resistant case is provided for a mobile electronic device. The case includes a main body casing that comprises (i) a first surface, (ii) a second surface opposite the first surface, (iii) a first chamber between the first and second surfaces, with the first chamber configured to receive the mobile electronic device, (iv) a second chamber containing a buoyant material, (v) an opening to the first chamber, and (vi) a first attachment structure provided on the first surface or the second surface at a position opposite to the first chamber. The case also includes a closure flap connected to the main body casing, with the closure flap including (i) an open end, (ii) a passage connecting the open end and the opening to the first chamber in the main body casing, (iii) a sealable structure that can provide a watertight seal to the passage, and (iv) a second attachment structure. The closure flap is movable between a position extended from the main body casing for receiving the mobile electronic device through the open end of the closure flap, to a folded position where the closure flap is positioned adjacent to the main body casing and where the second attachment structure on the closure flap is positioned to the first attachment structure on the main body casing.

In another embodiment of the invention, a water resistant case is provided that includes a flexible plastic sleeve having a closed end and an open end opposite to the closed end. A buoyant structure is provided inside the flexible plastic sleeve adjacent to the closed end. A sealing structure is provided adjacent to the open end of the flexible sleeve, with the sealing structure providing a watertight seal to the open end. The flexible plastic sleeve is configured to stretch to a configuration having a length, a width, and a height when receiving the mobile electronic device, and the buoyant structure extends, in the direction of the width of flexible plastic sleeve, to no greater than the width of the flexed plastic sleeve surrounding the mobile electronic device when the flexible plastic sleeve receives the mobile electronic device.

According to yet another embodiment of the invention, a water resistant case is provided for a mobile electronic device that comprises an outer casing including (i) a closed first end, (ii) a second end opposite to the first end, with the second end having an opening and a watertight sealing structure, (iii) a front side extending between the first end and the second end, (iv) a back side opposite to the front side, with the front side extending between the first end and the second end, (v) a first side extending between the first end and the second end, and (iv) a second side extending between the first end and the second end. A second chamber is provided inside the outer casing, with the second chamber extending adjacent to the first end, adjacent to the first side, and adjacent to the second side, and a buoyant material is provided in the second chamber. The second end of the outer casing is configured to move between an extended position for receiving the mobile electronic device and a folded position wherein at least part of the second end overlaps the first chamber.

DETAILED DESCRIPTION OF THE INVENTION

The present invention relates to a case for a mobile electronic device. Mobile electronic devices include, for example, cellular telephones, portable music players, GPS devices, and small computing devices. The case is configured to be relatively form fitting to the device, configured to be water resistant, and the case, when holding the mobile electronic device, is buoyant in water.

A case according to an embodiment of the invention is shown in FIGS. 1-5. In general, the case 10 includes a main body casing 12 and a closure flap 14. As will be explained below, a mobile electronic device is inserted through the closure flap 14 to the inside of the main body casing 12 when the closure flap 14 is extended away from the main body casing 12. Then, the closure flap 12 is folded adjacent to the main body casing 12 to enclose the mobile electronic device.

Figure 1:
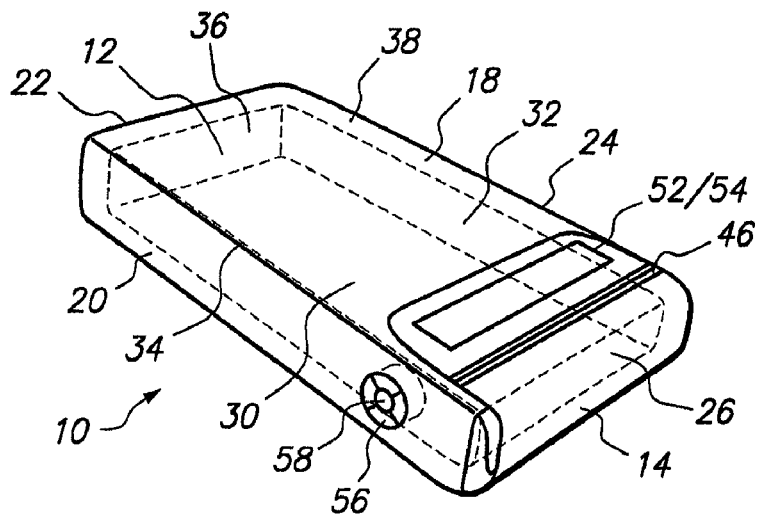
FIG. 1 is a view of a back side of a case according to an embodiment of the invention.

The main body casing 12 includes a front surface 16, a back surface 18, and side surfaces 20, 22, and 24 between the front surface 16 and the back surface 18. A first chamber 30 for receiving the mobile electronic device is formed between the surfaces 16, 18, 20, 22, and 24. The main body casing 12 also includes an opening 26 to the first chamber 30. As shown in FIG. 1, the first chamber 30 is bounded inside the main body casing 12 by a first side wall 32, a second side wall 34, and an end wall 36.

The first chamber 30 may be sized and shaped to receive multiple types of mobile electronic devices, or specifically sized and shaped to receive a particular type of mobile electronic device. For example, the first chamber 30 is specifically configured to receive an iPhone made by Apple, Inc., of Cupertino, Calif., in one embodiment, while in another embodiment the first chamber 30 is specifically configured to receive a DROID® phone by Motorola, Inc., of Schaumburg, Ill. Of course, configurations for other specific types of mobile electronic devices will be readily apparent to those skilled in the art.

Figure 2:
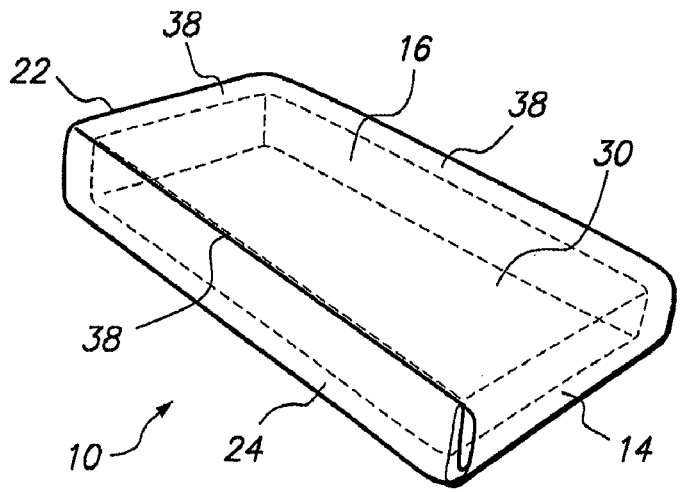
FIG. 2 is a view of the front side of the case shown in FIG. 1.

A second chamber 38 is provided in the main body casing 12. As shown in FIGS. 1 and 2, the second chamber 38 is formed between the sides 20, 22, and 24 of the main body casing 12 and the walls 32, 24, and 36 that bound the first chamber 30. The second chamber 38 is provided with a buoyant material such that the case 20 will float in water when a mobile electronic device is inserted into the first chamber 30. In some embodiments, the buoyant material is air. In alternative embodiments, the buoyant material is a solid material such as foam or cork. Of course, the buoyant material could also be a combination of air and the solid material. Those skilled in the art will recognize that a variety of other materials and combinations of materials could be used at the buoyant material in the second chamber 38.

It should be noted that while in the depicted case 10 the second chamber 38 is partially formed by the walls of the main body casing 20 and partially formed by the walls that bound first chamber 30, in other embodiments the second chamber 38 is configured as its own structure, separate from the other parts of the case 10. The second chamber 38 containing the buoyant material can be, for example, an inflated article inserted in the main body casing 12. In such embodiments, the case 10 may still include the walls 32, 34, and 36 bounding the first chamber 30, or the walls 32, 34, and 36 could be eliminated and the inflated article containing the buoyant material could form the bounds of the first chamber 30.

The case 10, and in particular, the second chamber 38 with the buoyant material, is sized and configured such that the case 10, when containing the mobile electronic device, will be buoyant in water. More precisely, and as will be recognized by those skilled in the art, in order to be buoyant Archimedes principle and the principles of naval architecture will inform the selection of the buoyant material and the configuration of the case 10.

In the embodiment depicted in FIGS. 1-5, the second chamber 38 is configured as a singular chamber that extends adjacent to the sides 20, 22, and 24 of the main body casing 12. In alternative embodiments, the second chamber 38 is divided into multiple chambers. For example, three separate chambers can make up the second chamber, with each of the separate chambers being provided along one of the sides of the main body casing 12. In still other embodiments, the second chamber is only provided in part of the area of the depicted second chamber 38. For example, in one embodiment a second chamber is provided as one chamber adjacent to the side 20 of the main body casing 12 and as another chamber adjacent to the side 24 of the main body casing 12, but no part of the second chamber is included at the side 22 of the main body casing 12.

Figure 3:
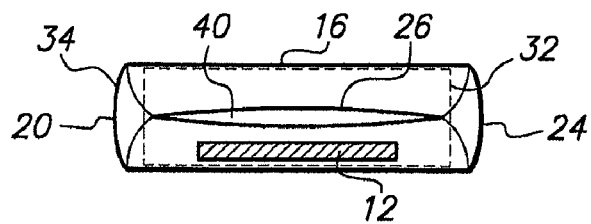
FIG. 3 is a view of an end of the case shown in FIG. 1.
Figure 4:
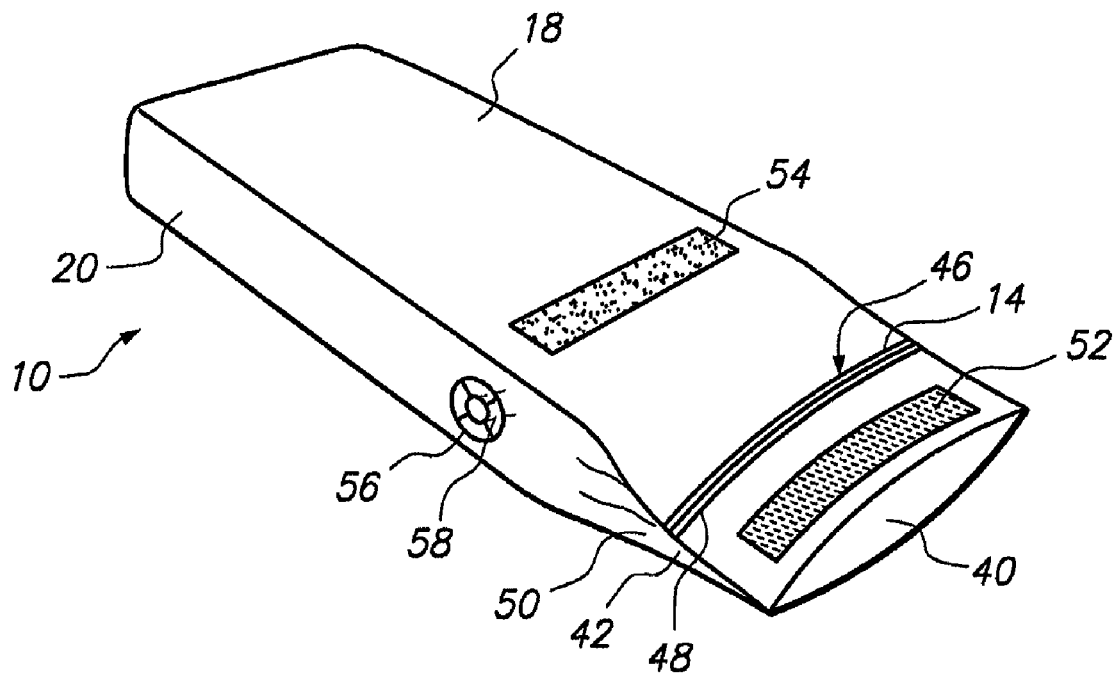
FIG. 4 is view of the case shown in FIG. 1 in an open position to receive the mobile electronic device.
Figure 5:
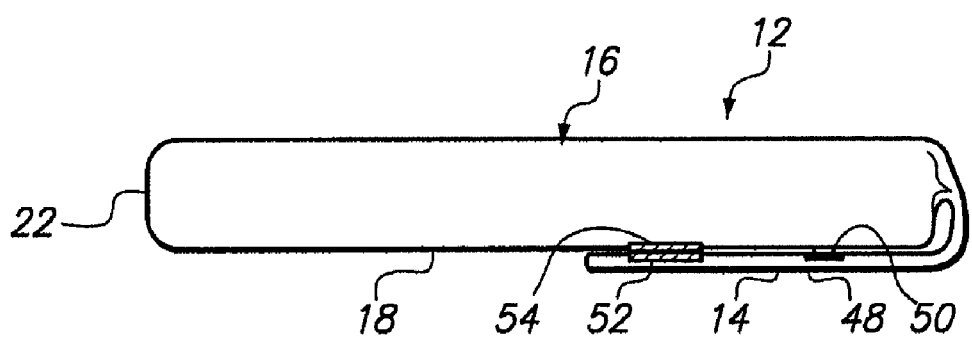
FIG. 5 is a side view of the case shown in FIG. 1 holding a mobile electronic device.

As noted above, the case 10 includes a closure flap 14 adjacent to the opening 26 to the first chamber 30. The closure flap 14 is movable between a position where the closure flap 14 is extended away from the main body casing 12 (FIGS. 3 and 4), to a folded position where the closure flap 14 is adjacent to the surface 18 of the main body casing 12 (FIGS. 1, 2, and 5). As shown in FIGS. 3 and 4, in the extended position the closure flap 14 is formed so as to provide an opening 40 and a passage 42 leading to the opening 26 to the first chamber 30. The mobile electronic device can be inserted through the opening 40 and passage 42 to the first chamber 30 when the closure flap 14 is in the extended position. Also, as will be further discussed below, the case 10 may be constructed from a plastic material. With such a construction, the elasticity of the plastic allows for easy insertion of the mobile electronic device through the closure flap 14.

The closure flap 14 includes a sealing structure 46 capable of blocking water from passing through the passage 42 to the opening 30 to the first chamber 30, i.e., a watertight seal. The sealing structure 46 can be further configured to provide an airtight seal. In the depicted case 10, the sealing structure 46 includes interlocking fastening strips 48 and 50. While this arrangement can provide a watertight seal when the first fastening strip 48 is engaged with the second fastening strip 50, the fastening strips 48 and 50 can also be separated when the closure flap 12 is opened to insert or to remove the mobile electronic device from the case 10. In other embodiments, multiple pairs of interlocking strips may be provided to further ensure a watertight and/or airtight seal. Those skilled in the art will also recognize that there are suitable alternatives to the depicted fastening strips 48 and 50 that could be used to provide the seal, such as a zipper similar to structures that are used in resealable food storage bags.

The closure flap 14 also includes an attachment structure 52. When the closure flap 14 is folded over to a position adjacent to surface 18 of the main body casing 12, the attachment structure 52 on the closure flap 14 is positioned to a corresponding attachment structure 54 provided on the surface 18 of the main body casing 12. The attachment structures 52 and 54 hold the closure flap 42 in the folded position. In one embodiment, the attachment structures 52 and 54 are a hook and loop combination, such as VELCRO® by Velcro USA, Inc. of Manchester, N.H. In other embodiments, the attachment structures can take a variety of other forms, such as buttons, zippers, or adhesive structures.

As can be seen in FIG. 5, when the closure flap 14 is positioned adjacent to the main body casing 12, the case 10 as a whole is compact and relatively form fitting to the contained mobile electronic device. The configuration of the case 10 with the attachment structure 52 on the foldable closure flap 14 and the corresponding positioning of the attachment structure 54 on the surface 18 of the main body casing 12 results in a configuration that does not have a bulky closure structure separated from the rest of the case. In other words, the positioning of the closure flap 14 such that it overlaps with the first chamber 16 when the mobile electronic device is contained in the case 10 allows the case 10 to more closely match the size of the mobile electronic device.

As can be seen in FIGS. 4 and 5, the main body casing 12 and closure flap 14 are formed from a continuous piece of material, i.e., the main body casing 12 and the closure flap 14 are integral to each other. In other embodiments, the main body casing 20 and closure flap 14 are formed from separate materials, and subsequently joined together in manufacturing the case. For example, when the main body casing 12 and the closure flap 14 are formed from separate plastic materials, the main body casing 12 and the closure flap 14 can be heat sealed together. The plastic materials for forming the case will be further discussed below.

The case 10 includes a port 56 for providing an operative connection between a structure outside the case 10 and the mobile electrical device contained in the case 10. The port 56 can be configured, for example, to connect electrical cords such as audio cables or power cords to the contained mobile electronic device. A plug 58 provides a watertight seal to the port 56 when the port 56 is not in use. Moreover, the port 56 is configured to be watertight when receiving an electrical cord. In some embodiments, a watertight seal is achieved by providing a gasket structure in the port 56 that seals against electrical cabling provided through the port 56. In still other embodiments, the port 56 is configured to receive the operative end of the cabling, but there is not a passage extending all the way through the port 56, thereby preventing water from entering the case. In such a configuration, a separate cabling is provided from a portion of port 56 inside the case 10 for connection to the device inside the case 10. As a specific example, the outside of the port 56 can be configured to receive the jack at the end of a headphone cable, and a second cable is provided from a portion of the port 56 inside the case. The other end of the second cable inside the case includes a jack for insertion in an audio port in the mobile electronic device contained in the case 10, thereby establishing an operative connection between the headphones and the contained mobile electronic device.

It should be noted that while the depicted port 56 is provided at a position on a side surface 20 of the main body casing 12 adjacent to the closure flap 14, the port 56 can also be provided at other positions on the main body casing 12 or on the closure flap 14. In specific embodiments, the port 56 is positioned to be close to the position of operative structures on the particular mobile electronic device that the case 10 is designed to contain. For example, the port 56 can be provided at a position on the case 10 that is proximate to the position of an audio jack in the type of mobile electronic device to be inserted in the case. It should also be noted that other embodiments of the case do not include any port. Without a port, an operative connection could still be provided to the contained mobile device, for example using Bluetooth® technology made by the Bluetooth Special Interest Group of Kirkland, Wash.

In still further examples, the case 10 includes a compressible material, such as felt, which lines one or more of the walls of the first chamber 30. The compressible material allows for easy insertion of the device, while still preventing a loose fit that would allow the device to rattle between the walls of the first chamber 30. Also, additional shock resistant inserts can also be provided inside the case 10.

An alternative embodiment of a case according to the invention is shown in FIGS. 6-9. In this embodiment, the case 100 includes a front surface 102, a back surface 104, and side surfaces 106 and 108, with the surfaces forming an enclosed chamber 105 in which the electronic device 200 is received. The case 100 also includes a closed end 110 and a closure flap 112, as will be described below.

Figure 8:
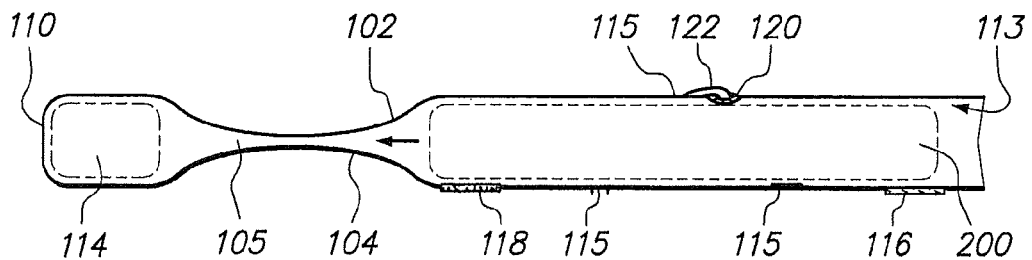
FIG. 8 is a side cross-sectional view of the mobile electronic device being inserted in the case shown in FIG. 6.
Figure 9:
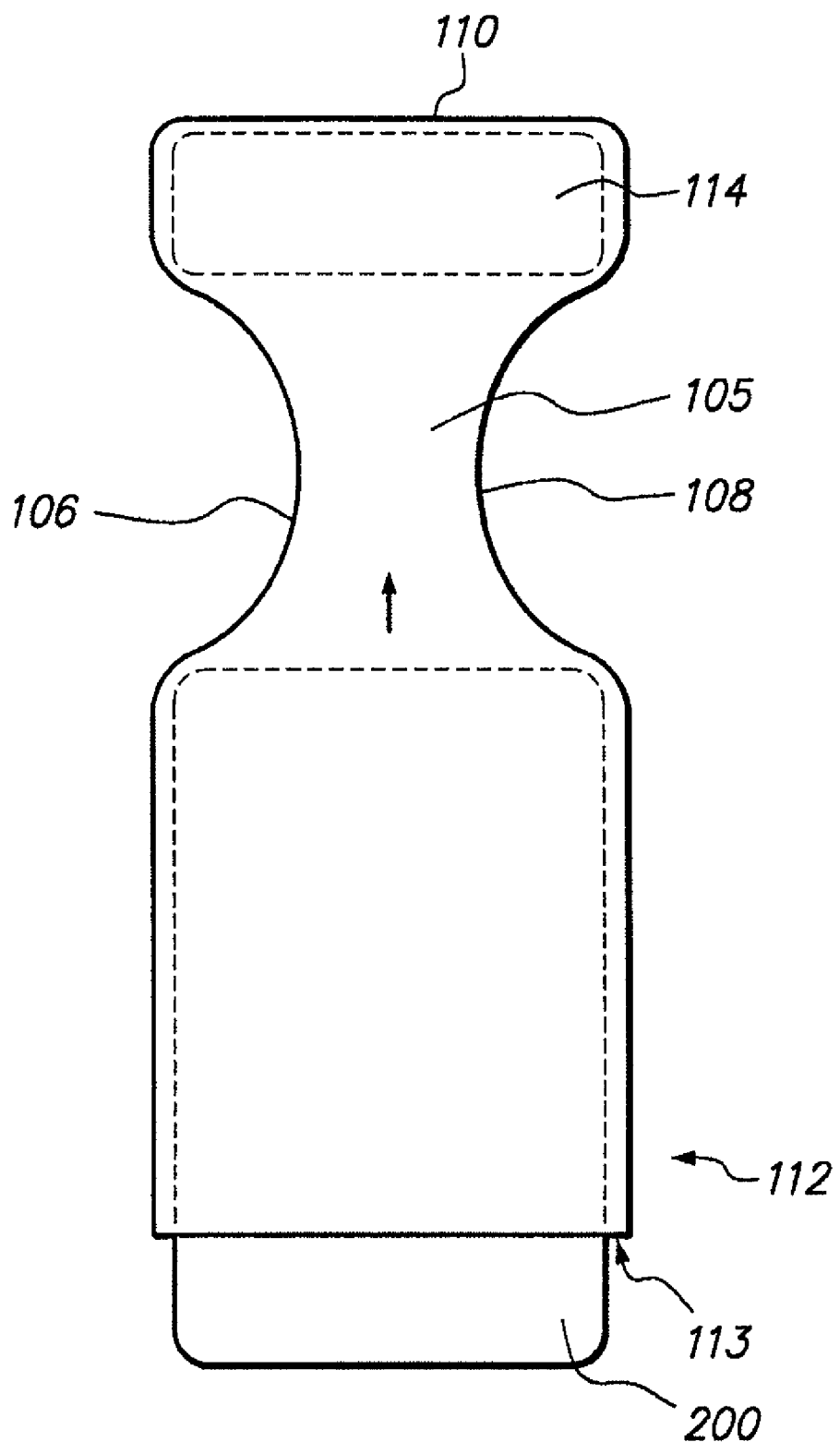
FIG. 9 is a top cross-sectional view of the mobile electronic device being inserted in the case shown in FIG. 6.

The case 100 is constructed from a flexible plastic material. As shown in FIGS. 8 and 9, the flexible plastic material is configured and sized such that the front surface 102, back surface 104, and side sides 106 and 108, stretch from a reduced size to an extended size upon insertion of the electronic device 200 into the case 100. As such, the case 100 fits tightly around the mobile electronic device 200 along the front and back surfaces 102 and 104, and along the sides 106 and 108. In effect, the case 100 forms a tight-fitting sleeve around the device 200.

A buoyant structure 114 is provided adjacent to the closed end 110 of the case 100. In some embodiments, the buoyant structure 114 is a piece of buoyant material, such as foam or cork. In other embodiments, the buoyant structure 114 is a container filled with a buoyant material, such as an air-filled bag. The buoyant structure 114 may either be attached to the inside of the case 100, or provided as a separate piece inserted into the case 100. Like the other depicted embodiment described above, the case 100 and buoyant structure 114 are sized and configured such that the case 100 is buoyant in water when containing the mobile electronic device 200.

Figure 6:
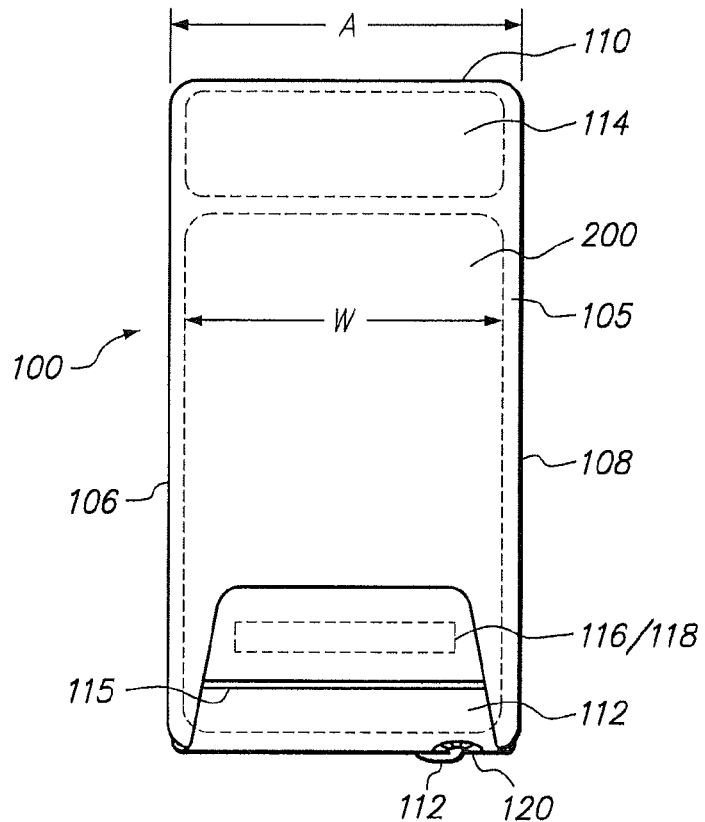
FIG. 6 is a view of the back side of a case according to an embodiment of the invention.
Figure 7:
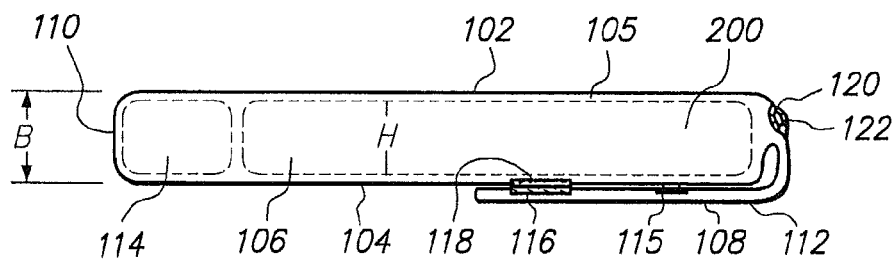
FIG. 7 is a side view of the case shown in FIG. 6.

As shown in FIG. 6, the buoyant structure 114 is configured to extend to no greater than the distance A between the sides 106 and 108 when the case 100 is stretched to receive the mobile electronic device 200. In this manner, the case 100 is sized to closely match the width W of the mobile electronic device 200, with the buoyant structure not adding any additional width to the case 100. Further, as shown in FIG. 7, the buoyant structure 114 is configured to extend no greater than the distance B between sides 102 and 104 when the case is stretched to receive the mobile electronic device 200. As such, the case 100 is sized to closely match the height H of the mobile electronic device 200, with the buoyant structure 114 not adding any additional height to the case 100. It should be noted, however, that while the depicted embodiment shows the buoyant structure 114 matching both the width W and the height H of the contained mobile electronic device 100, in alternative embodiments the buoyant structure 114 could be made larger than one of these two dimensions of the mobile electronic device 100.

The case 100 includes a closure flap 112 at the end opposite to the closed end 110. The closure flap 112 is similar to the closure flap in the embodiment depicted in FIGS. 1-5 and described above. The closure flap 112 is movable between an extended position for receiving the mobile electronic device through an opening 113 (FIGS. 8 and 9), to a folded position when the device is contained in the case 100 (FIGS. 6 and 7). The closure flap 112 includes a sealing structure 115 for providing a watertight and/or airtight seal to the opening 113. As shown in FIG. 7, the closure flap 112 also includes an attachment structure 116 that is positioned to an attachment structure 118 on the back surface 104 of the case 100 when the closure flap 112 is folded adjacent to the rest of the case 100. The sealing structure 115 and the attachment structures 116 and 118 may be configured similar to the sealing structure and attachment structures in the embodiment depicted in FIGS. 1-5 and described above.

The case 100 also includes a port 120 and a corresponding plug 122. The port 120 is configured to receive electrical cords as with the port in the embodiment described above. Notably, in this embodiment, the port 120 is provided on the closure flap 112. Again, however, the port 120 can be provided at other positions on the case 100.

As indicated above, a case according to embodiments of the invention can be made from a plastic material. The plastic can be formed from polymers such as polyurethane or polyethylene. Such plastics are water resistant, and also resistant to tears and punctures. It should be noted that the term water resistant, as used herein, encompasses the term "water proof," and accordingly a water proof material qualifies as water resistant material. Additionally, the thickness of the plastic material for the case can readily be optimized to achieve desirable properties. In some embodiments, the plastic material forming parts of the case can also provide shock resistance, such as providing resilient deformation in the event that the case is dropped onto a hard surface.

The plastic material used to form a case according to the invention can be a substantially transparent material so that the mobile electronic device is visible inside the case. Further, the plastic material can be constructed such that at least a front surface of the case adjacent to a touch screen interface of the mobile electronic device is conductive of finger strokes so that the device can be operated through the front surface of the case. In alternative embodiments, while the area of the case adjacent to the operative interface of the device is substantially transparent and conductive of finger strokes, the other areas of the case can be made colored and possibly include artistic designs.

Although this invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

I claim:

1. A water resistant case for a mobile electronic device, the case comprising:
   a main body casing having a first end and an opposite second end, the main body casing including (i) a first surface, (ii) a second surface opposite to the first surface, (iii) a first chamber between the first surface and the second surface, adjacent the first end, and configured to receive the mobile electronic device, (iv) a second chamber between the first surface and the second surface and containing a buoyant material, (v) an opening to the first chamber, and (vi) a first attachment structure provided on at least one of the first surface and the second surface at a position opposite to the first chamber; and
   a closure flap connected to the first end of the main body casing, the closure flap including (i) an open end, (ii) a passage connecting the open end and an opening to the first chamber in the main body casing, (iii) a sealing structure that can provide a watertight seal across the passage, and (iv) a second attachment structure; and
   wherein the closure flap is movable between a position extended from the main body casing for receiving the mobile electronic device through the open end of the closure flap, to a folded position where the closure flap is positioned adjacent to the main body casing and where the second attachment structure on the closure flap is positioned to the first attachment structure on the main body casing.

2. A case according to claim 1, wherein a wall inside the main body casing is common to the first chamber and the second chamber.

3. A case according to claim 1, wherein the buoyant material includes at least one of air, foam, and cork.

4. A case according to claim 1, wherein the second chamber is provided at the second end of the main body casing.

5. A case according to claim 4, wherein:
   the main body casing further includes a first side extending between the first end and the second end, and a second side extending between the first end and the second end; and
   the second chamber is further provided along at least one of the first side and the second side of the main body casing.

6. A case according to claim 1, wherein the main body casing and the closure flap are an integral structure formed from flexible plastic.

7. A case according to claim 6, wherein an area of a flexible plastic forming at least one of the first surface and the second surface of the main body casing is substantially transparent and conductive of finger strokes.

8. A case according to claim 1, further comprising a port formed in at least one of the main body casing and the closure flap, the port for receiving an electrical cord.

9. A case according to claim 1, wherein the sealing structure includes at least one pair of interlocking structures.

10. A case according to claim 1, wherein the first attachment structure and the second attachment structure are a hook and loop combination.

11. A water resistant case for a mobile electronic device, the case comprising:
    a flexible plastic main body casing forming a sleeve having a front surface, a back surface, two closed sides, a closed end, and an open end opposite to the closed end, the open end defining an opening;
    a buoyant structure provided inside the sleeve and adjacent to the closed end; and
    a sealing structure coupled to the sleeve adjacent to the open end, the sealing structure providing a watertight seal, between the open end, the opening, and the interior of sleeve;
    wherein the sleeve is configured to stretch when receiving the mobile electronic device to a configuration having a length, a width between the two closed sides, and a height between the front surface and back surface, and
    wherein the buoyant structure extends, in the direction of the width of the sleeve, to no greater than the width of the sleeve surrounding the mobile electronic device when the sleeve receives the mobile electronic device.

12. A case according to claim 11, wherein the buoyant structure extends, in the direction of the height of the sleeve, to no greater than the height of the sleeve surrounding the mobile electronic device when the sleeve receives the mobile electronic device.

13. A case according to claim 11, wherein the buoyant structure is at least one of a chamber filled with air, a foam material, and a cork material.

14. A case according to claim 11, further comprising: a first attachment structure provided on the sleeve; and a second attachment structure provided on the sleeve adjacent to the open end, wherein the sleeve is movable to between a position wherein the first attachment structure and the second attachment are separated from each other, to a position wherein the first attachment structure and the second attachment structure are positioned adjacent to each other.

15. A case according to claim 11, further comprising a port formed in the sleeve for receiving an electrical cord.

16. A water resistant case for a mobile electronic device, the case comprising:
    an outer casing including (i) a closed first end, (ii) a second end opposite to the closed first end, the second end defining an opening and having a sealing structure providing a watertight seal between the opening and an interior of the outer casing, the sealing structure coupled to the outer casing (iii) a front side extending between the closed first end and the second end, (iv) a back side opposite to the front side, the front side extending between the closed first end and the second end, (v) a first side extending between the closed first end and the second end, and (iv) a second side extending between the first end and the second end;

a first chamber provided inside the outer casing and between the front side and the back side, the first chamber in communication with the opening and configured to receive the mobile electronic device;

a second chamber provided inside the outer casing, the second chamber extending adjacent to at least the closed first end, the first side, and the second side; and a buoyant material provided in the second chamber; and wherein the second end of the outer casing is configured to move between an extended position for receiving the mobile electronic device through the opening and into the first chamber, and a folded position wherein the second end is positioned adjacent to the back side and at least part of the second end overlaps the first chamber.

17. A case according to claim 16, further comprising a port formed in the outer casing, the for receiving an electrical cord.

18. A case according to claim 16, wherein the buoyant material is at least one of air, a foam material, and a cork material.

19. A case according to claim 16, wherein a wall of the second chamber is partially formed by the outer casing, and wherein the first chamber is partially formed by a wall of the second chamber.

20. A case according to claim 16, wherein the front side is substantially transparent and conductive of finger strokes.

* * * * *